(12) United States Patent  (10) Patent No.: US 7,696,434 B2
Ruddick  (45) Date of Patent: Apr. 13, 2010

(54) CONDUITS

(75) Inventor: Paul David Ruddick, Whitley Bay (GB)

(73) Assignee: D-LINE (Europe) Limited (GB)

( * ) Notice: Subject to any disclaimer, the term of this patent is extended or adjusted under 35 U.S.C. 154(b) by 721 days.

(21) Appl. No.: 10/589,230

(22) PCT Filed: Mar. 8, 2005

(86) PCT No.: PCT/GB2005/000889

§ 371 (c)(1),
(2), (4) Date: Dec. 5, 2006

(87) PCT Pub. No.: WO2005/086304

PCT Pub. Date: Sep. 15, 2005

(65) Prior Publication Data

US 2008/0149362 A1   Jun. 26, 2008

(30) Foreign Application Priority Data

Mar. 8, 2004  (GB) ................................ 0405182.7

(51) Int. Cl.
*H02G 3/04* (2006.01)
(52) U.S. Cl. ...................... 174/68.3; 174/68.1; 174/481; 174/70 C; 138/108; 138/115; 52/220.7; D13/155
(58) Field of Classification Search .................. 174/480, 174/481, 68.1, 68.3, 135, 72 R, 70 C, 72 A, 174/74 R, 99 R, 72 C, 97; 52/220.1, 220.3, 52/220.5, 220.7; 138/108, 158, 115, 95, 138/100, 111, 162, 166, 168, 119; 248/316.7, 248/51, 489; D8/395, 356, 371; D13/155, D13/173, 184, 154, 156
See application file for complete search history.

(56) References Cited

U.S. PATENT DOCUMENTS 3,786,171 A * 1/1974 Shira ........................ 174/72 C (Continued)

FOREIGN PATENT DOCUMENTS

DE       7215464       7/1972

(Continued)

OTHER PUBLICATIONS

Internet Page Printout: http://oami.europa.eu/bulletin/rcd/2003/2003_010/000029814_0001.htm Registered Community Design # 000029814-0001, Published Aug. 5, 2003.

(Continued)

*Primary Examiner*—Angel R Estrada
(74) *Attorney, Agent, or Firm*—Salvatore A. Sidoti; Joseph G. Curatolo; Curatolo Sidoti Co., LPA

(57) ABSTRACT

A conduit (1) having a substantially semi-circular outer cross-section comprising a base portion (3) and a lid portion (2), the lid portion (2) being attached to the base portion (3) by a hinge (4) and having a clip (23) on the opposite side, wherein the hinge (4) is located at an angular elevation from the base of between 10° and 35°, the base portion (3) having a clip socket for retaining the clip (23), wherein the clip socket comprises an outer wall (32), which forms part of the semi-circular outer cross-section, and an inner wall (33), between which is defined a channel (34) for the clip (23), the height of the inner wall above the bottom of the base portion (3) being substantially the same as the height of the hinge (4) above the bottom of the base portion (3).

17 Claims, 2 Drawing Sheets

U.S. PATENT DOCUMENTS

| | | | |
|---|---|---|---|
| 4,245,924 A * | 1/1981 | Fouss et al. | 138/119 |
| 4,530,865 A * | 7/1985 | Sprenger | 174/68.3 |
| 4,629,826 A | 12/1986 | Thomas | |
| 5,235,136 A * | 8/1993 | Santucci et al. | 174/68.3 |
| 5,274,194 A * | 12/1993 | Belcher | 174/97 |
| 6,323,421 B1 * | 11/2001 | Pawson et al. | 174/68.1 |
| 6,333,461 B1 | 12/2001 | Marcou et al. | |
| 6,437,243 B1 * | 8/2002 | VanderVelde et al. | 174/68.3 |
| 6,513,289 B1 * | 2/2003 | Decore et al. | 174/68.3 |
| 6,545,217 B2 * | 4/2003 | Sato | 174/135 |
| 6,972,367 B2 * | 12/2005 | Federspiel et al. | 174/68.1 |
| D539,752 S * | 4/2007 | Ruddick | D13/155 |
| D541,143 S * | 4/2007 | Ruddick | D8/395 |

FOREIGN PATENT DOCUMENTS

| | | |
|---|---|---|
| DE | 29502856 | 3/1996 |
| GB | 881847 | 11/1961 |
| GB | 1420216 | 1/1976 |
| JP | 8-256415 | 10/1996 |
| JP | 2000-253535 | 9/2000 |

OTHER PUBLICATIONS

Internet Page Printout: http://webd1.patent.gov.uk/rs-bin/RightSite/formexec?... UK Design Register # 30110551, Published Feb. 14, 2003, Paul David Ruddick.

* cited by examiner

CONDUITS

CROSS REFERENCE TO RELATED APPLICATIONS

This application is a national stage application of International Application No. PCT/GB2005/000889, filed Mar. 8, 2005, which claims the benefit of Application No. GB 0405182.7, filed Mar. 8, 2004, from which applications priority is claimed.

The present invention relates to conduits for concealing pipework, wires and the like.

Conduits have been used for many years for concealing pipework and wires in a domestic and industrial setting. In particular, surface-mounted conduits are used where it is not desired to damage the surface along which the wires or pipework is to run, but the presence of uncovered wires and pipes on the surface would be unsightly, or possibly dangerous.

Surface-mounted conduits are also useful where the wires or pipes, and their connectivity are changed periodically, as the surface-mounted conduit allows for easy access.

The present inventor has previously disclosed in UK Registered Design Numbers 3010551 and 3010552, surface-mounted conduits having a semi-circular cross section. These conduits offer aesthetic advantages over the prior art rectangular cross-section conduits, but also reduce the problem of dust gathering in the corners formed with the surface on which they are mounted. Similar conduits are also described in GB 1 420 216 and U.S. Pat. No. 4,629,826.

The prior art semi-circular cross-section conduits include a hinged lid to allow access to the channel inside the conduit, but the location of the hinge immediately adjacent the surface on which the conduit is mounted causes difficulties in opening the conduit, as well as in closing the conduit due to the relationship between the location of the hinge and the location of the clip.

Accordingly, a first aspect of the present invention provides a conduit having a substantially semi-circular outer cross-section comprising a base portion and a lid portion, the lid portion being attached to the base portion by a hinge, wherein the hinge is located at an angular elevation from the base of between 10° and 35°, and having a clip on the opposite side, the base portion having a clip socket for retaining the clip, wherein the clip socket comprises an outer wall, which forms part of the semi-circular outer cross-section, and an inner wall, between which is defined a channel for the clip, the height of the inner wall above the bottom of the base portion being substantially the same as the height of the hinge above the bottom of the base portion.

The angular elevation of the hinge is measured about the centre of the semi-circle which defines the semi-circular outer cross-section of the conduit.

The term "substantially semi-circular" as used herein, refers to a shape which is a semi-circle, or gives the impression of being semi-circular whilst not requiring exact correspondence with a semi-circle. The shape may be distorted to some extent, as long as it retains the appearance of being a semi-circle.

This arrangement contributes to the ease of opening and closing the conduit lid, whilst maintaining the semi-circular outer profile of the conduit, and allows for the lid of the conduit to be folded back when installing the conduit, or working inside the conduit once it is attached to a surface.

The term "substantially the same height" means herein that on a cross-section of the conduit a line between the hinge and the top of the inner wall is within 10° of parallel with the base of the conduit. Preferably the line is within 5° or even 2° of parallel with the base of the conduit.

It is preferred that the hinge is located at an angular elevation from the base of between 15° and 30°, and most preferably between 20° and 25°.

The outer wall of the clip socket is preferably shorter than the inner wall. This difference in length can be described as a difference in angular elevation from the base, with the outer wall preferably having an angular elevation from the base which is at least 5°, more preferably 7° or even 10° less, than that of the inner wall.

The outer wall of the clip socket preferably has a retaining lip thereon, which engages with a corresponding retaining groove in the clip. Thus, the clip is retained in the channel between the inner and outer walls of the clip socket by the inter-engagement between the retaining lip of the outer wall and the retaining groove of the clip.

The portion of the clip which extends beyond the retaining groove into the channel between the inner and outer walls of the clip socket may extend the whole depth of the channel, i.e. such that it contacts the base of the channel, but it is preferred that it only extends a short distance beyond the retaining groove. This distance may be defined as a angular extension of no more than 15°, preferably no more than 10° or even 7°, from the centre of the retaining groove to the end of the clip.

There may be provided a sealing gasket on the clip or the clip socket to enable the conduit to be water-proof.

A buffer ledge may be provided in the base portion on the bottom wall and on or adjacent the wall to which the hinge is attached. This ledge is of such a size then when male flush fit accessories are inserted into the end of the conduit, the semi-circular outer profile of the conduit is retained by virtue of 'balancing' the presence of the inner wall of the clip socket.

The conduit is preferably straight, but may have some flexibility to bend along its length. Preferably lengths of conduit are joined by appropriate accessories to accommodate corners and the like in the surfaces on which it is mounted.

The design of the clip socket and clip as expressed in the above preferences may also be of benefit in other part-circular cross-section conduits. Accordingly, a second aspect of the present invention provides a conduit having a substantially part-circular outer cross-section comprising a base portion and a lid portion, the lid portion being attached to the base portion by a hinge and having a clip, the base portion having a clip socket for retaining the clip, wherein the clip socket comprises an outer wall, which forms part of the part-circular outer cross-section, and an inner wall, between which is defined a channel for the clip, wherein the outer wall of the clip socket is shorter than the inner wall of the clip socket, and the outer wall of the clip socket has a retaining lip thereon, which engages with a corresponding retaining groove in the clip, and wherein the clip extends only a short distance beyond the retaining groove into the channel between the inner and outer walls of the clip socket.

The terms used in defining this aspect have the same meaning as in the previous aspect, and the preferences of the first aspect also apply to this aspect.

The substantially part-circular cross section is semi-circular (180°) or less. One particularly preferred embodiment has a substantially quarter-circular (90°) cross-section.

Preferred embodiments of the present invention will now be described with reference to the accompanying figures in which.

Figure 1:
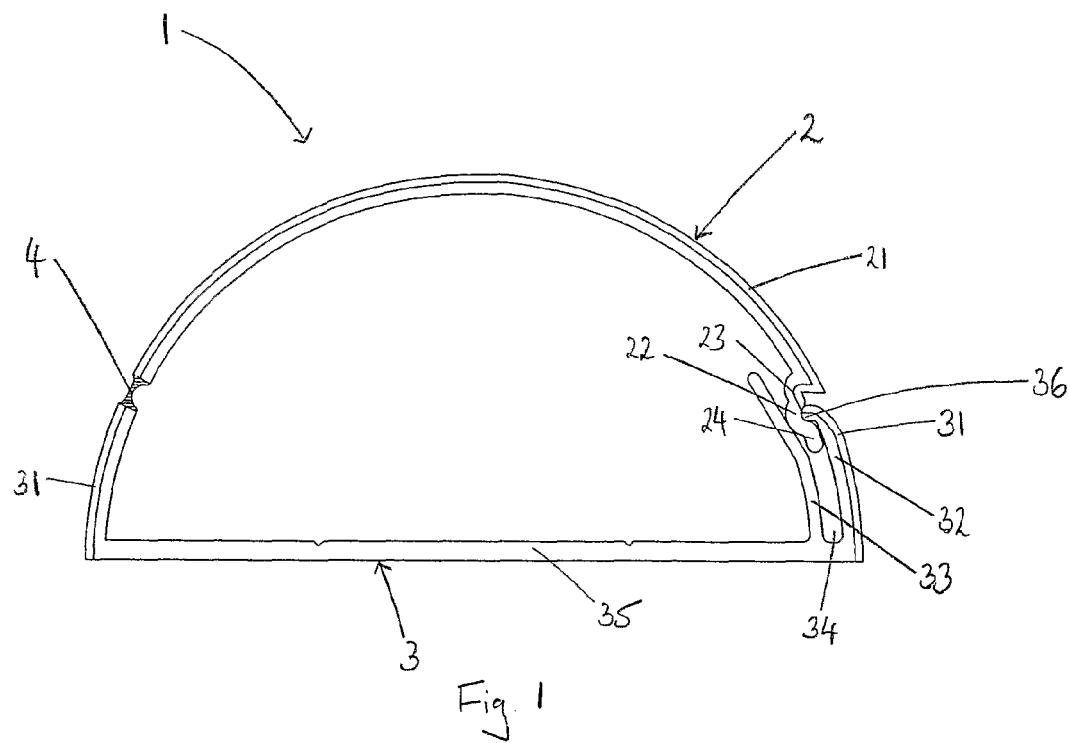
FIG. 1 shows the cross-section of a conduit according to the present invention.
Figure 2:
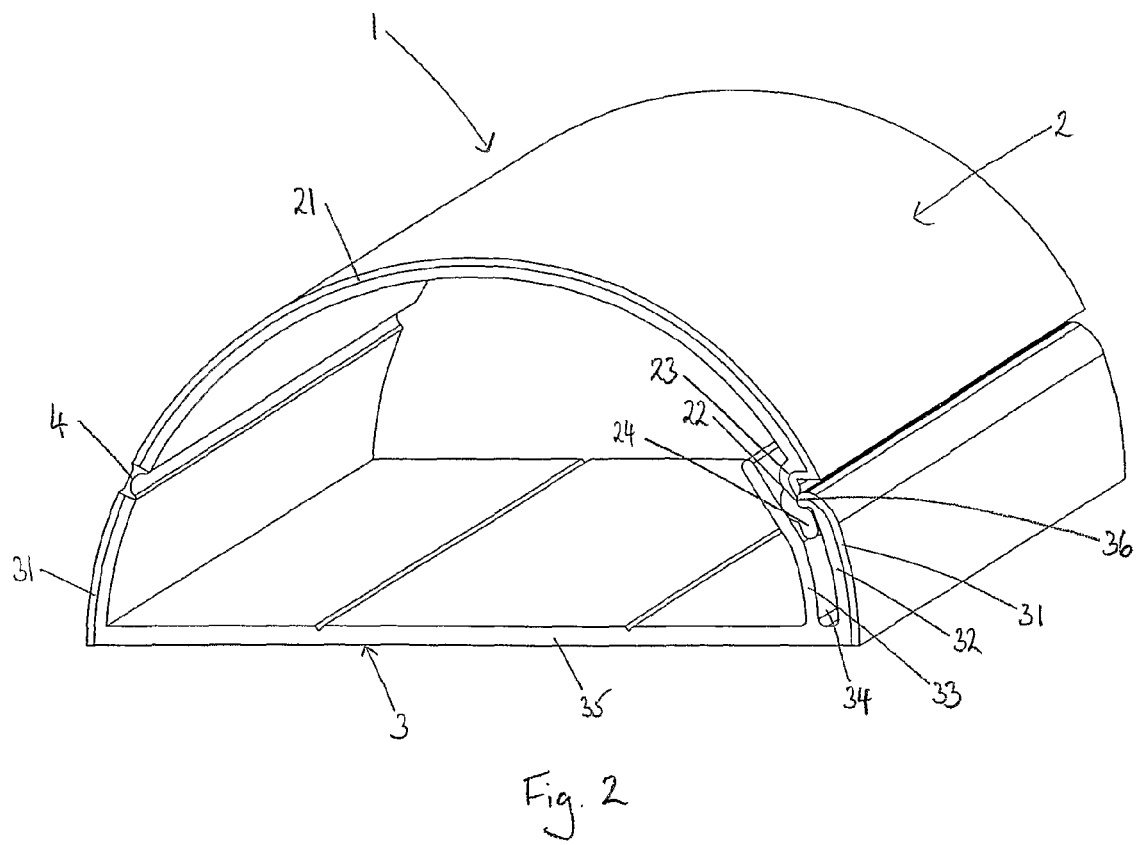
FIG. 2 shows a perspective view of a short length of the conduit of FIG. 1.

The conduit 1 shown in FIGS. 1 and 2 comprises a base portion 3 and a lid portion 2 joined by a hinge 4. The conduit 1 has a semi-circular outer cross-section.

Opposite the hinge 4 is a clip 23 which is part of the lid 2. The clip has a retaining groove 22 which interacts with a retaining lip 36 on an outer wall 32 of a clip socket. The clip socket also comprises an inner wall 33, and a channel 34 is defined between the outer wall 32 and the inner wall 34.

The hinge is at an angular elevation of about 22° from the base 35 of the base portion 3, and the inner wall 33 of the clip socket is at about the same height relative to the base 35. The elevation of the hinge 4 allows the lid portion 2 to be folded almost flat against a surface to which the conduit is attached. The outer wall 32 of the clip socket is shorter than the inner wall 33, and has an angular elevation from the base 35 which is about 7° less than the inner wall 33. The clip 23 has only a short extension 24 beyond the retaining groove 22, to allow for easy disengagement and engagement with the clip socket.

The conduit shown in FIGS. 1 and 2 is generally made from PVC, although the hinge 4 is made from TPE.

The conduit carries a coating 21 and 31 which is also made from PVC, which allows for different finishes to be given to the conduit, e.g. wood effect, metal effect.

The TPE hinge 4 is designed with sufficient tension so that it can be held back when the conduit 1 is open to facilitate the fixing of cables or pipes. The nature of the hinge 4 also allows for the lid 2 to be unlocked by being pushed away from the base portion 3, and acts a cushion to allow the lid 2 to be gently pushed backwards before it is snap-locked into the clip socket.

The inner wall 33 of the clip socket provides sufficient support for the lid 2 to enable the semi-circular outer profile of the conduit 1 to be maintained.

Figure 3:
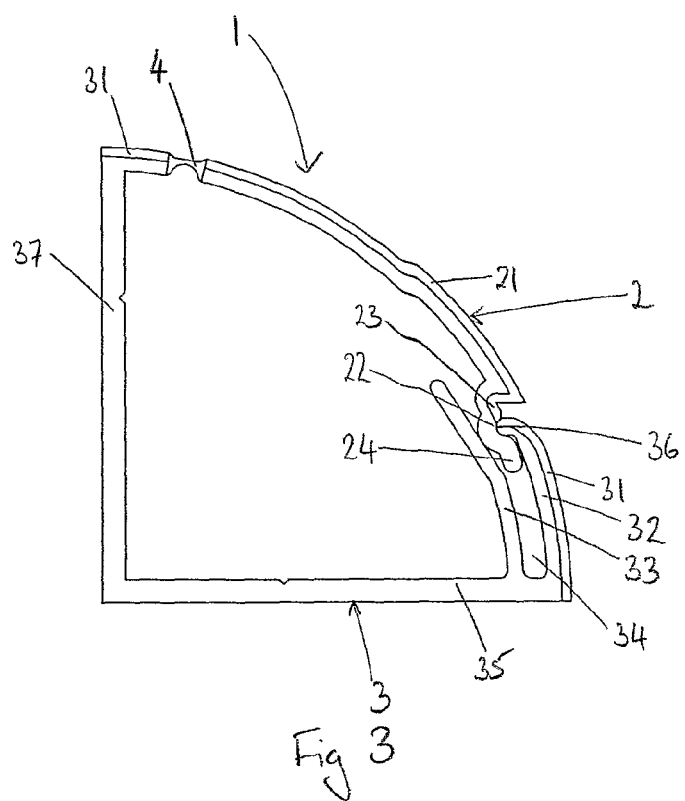
FIG. 3 shows the cross-section of a conduit according to the second aspect of the present invention.
Figure 4:
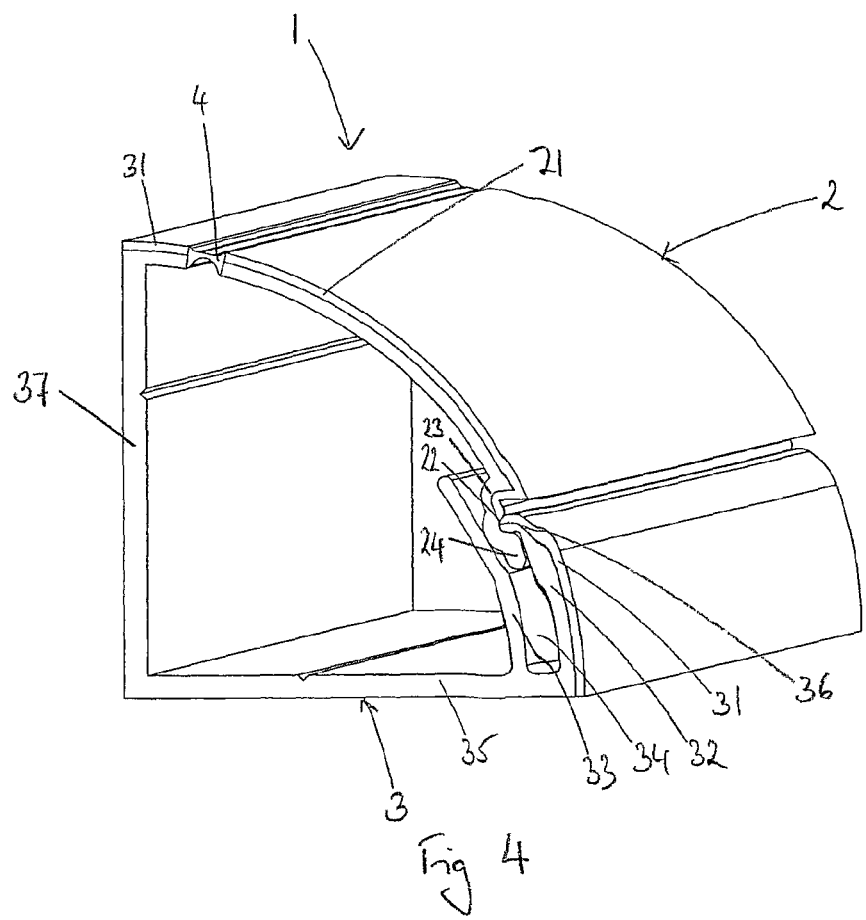
FIG. 4 shows a perspective view of a short length of the conduit of FIG. 3.

The conduit 1 shown in FIGS. 3 and 4 shares many of the features of the conduit 1 shown in FIGS. 1 and 2 and these are given the same reference numerals.

The conduit 1 has a quarter-circle cross section, and therefore the base portion 3 comprises a base wall 35 and a side wall 37, which are a right-angles to each other.

The invention claimed is:

1. A conduit having a substantially semi-circular outer cross-section comprising a base portion and a lid portion, the lid portion being attached to the base portion by a hinge and having a clip on the opposite side, wherein the hinge is located at an angular elevation from the base of between 10° and 35°, the base portion having a clip socket for retaining the clip, wherein the clip socket comprises an outer wall, which forms part of the semi-circular outer cross-section, and an inner wall, between which is defined a channel for the clip, the height of the inner wall above the bottom of the base portion being substantially the same as the height of the hinge above the bottom of the base portion.

2. A conduit according to claim 1, wherein on a cross-section of the conduit a line between the hinge and the top of the inner wall is within 5° of parallel with the base of the conduit.

3. A conduit according to either claim 1, wherein the hinge is located at an angular elevation from the base of between 20° and 25°.

4. A conduit according to claim 1, wherein the outer wall of the clip socket is shorter than the inner wall.

5. A conduit according to claim 4, wherein the outer wall has an angular elevation from the base which is at least 5° more than that of the inner wall.

6. A conduit according to claim 1, wherein the outer wall of the clip socket has a retaining lip thereon, which engages with a corresponding retaining groove in the clip.

7. A conduit according to claim 6, wherein the portion of the clip which extends beyond the retaining groove into the channel between the inner and outer walls of the clip socket extends a short distance beyond the retaining groove.

8. A conduit according to claim 7, wherein the short distance is an angular extension of no more than 10° from the centre of the retaining groove to the end of the clip.

9. A conduit according to claim 1, wherein a sealing gasket is provided on the clip or the clip socket.

10. A conduit according to claim 1, wherein a buffer ledge is provided in the base portion on the bottom wall and on or adjacent the wall to which the hinge is attached.

11. A conduit having a substantially semi-circular outer cross-section comprising a base portion and a lid portion, the lid portion being attached to the base portion by a hinge and having a clip on the opposite side, wherein the hinge is located at an angular elevation from the base of between 10° and 35°, the base portion having a clip socket for retaining the clip, wherein the clip socket comprises an outer wall, which forms part of the semi-circular outer cross-section, and an inner wall, between which is defined a channel for the clip, the height of the inner wall above the bottom of the base portion being substantially the same as the height of the hinge above the bottom of the base portion, wherein the outer wall of the clip socket has a retaining lip thereon, which engages with a corresponding retaining groove in the clip, wherein the portion of the clip which extends beyond the retaining groove into the channel between the inner and outer walls of the clip socket extends a short distance beyond the retaining groove, wherein the short distance is an angular extension of no more than 10° from the centre of the retaining groove to the end of the clip.

12. A conduit according to claim 11, wherein on a cross-section of the conduit a line between the hinge and the top of the inner wall is within 5° of parallel with the base of the conduit.

13. A conduit according to either claim 11, wherein the hinge is located at an angular elevation from the base of between 20° and 25°.

14. A conduit according to claim 11, wherein the outer wall of the clip socket is shorter than the inner wall.

15. A conduit according to claim 14, wherein the outer wall has an angular elevation from the base which is at least 5° more than that of the inner wall.

16. A conduit according to claim 11, wherein a sealing gasket is provided on the clip or the clip socket.

17. A conduit according to claim 11, wherein a buffer ledge is provided in the base portion on the bottom wall and on or adjacent the wall to which the hinge is attached.

* * * * *